Nov. 2, 1965          L. ALTMAN ETAL          3,214,974
                    REMOTE ACOUSTICAL SENSOR
                      Filed Dec. 18, 1963

INVENTOR.
LAWRENCE ALTMAN
BY  DONALD GERTZ

3,214,974
REMOTE ACOUSTICAL SENSOR
Lawrence Altman, New York, and Donald Gertz, Carle Place, N.Y., assignors, by mesne assignments, to the United States of America as represented by the United States Atomic Energy Commission
Filed Dec. 18, 1963, Ser. No. 331,634
2 Claims. (Cl. 73—290)

The present invention relates to the remote instrumentation of a vessel and more particularly, to the remote instrumentation of a vessel utilizing acoustical sensing techniques.

The development of the nuclear reactor has created a great deal of interest in devices which are capable of instrumenting the interior of a closed vessel with respect to such conditions as liquid level, temperature, and pressure, as well as others. The presence within the vessel of radioactive materials makes it most desirable to eliminate or at least minimize the possibility of leakage from the vessel at locations where instrumentation leads pass through the vessel wall. Even though sophisticated seals are developed and utilized, in time there is apt to be a deterioration of materials and there is increased possibility that some leakage will occur.

In addition, it is well known that instrumentation of a nuclear reactor represents a substantial portion of the capital costs and is a major item in maintenance, spare parts, calibration, training, and downtime resulting from instrumentation failure.

In a pressurized water reactor, instrumentation includes sensing devices within the reactor vessel to monitor such conditions as pressure, temperature, and liquid level. It is necessary, of course, in conventional arrangements to transfer the developed signals by way of leads through openings provided in the vessel wall. Aside from the possibility of leaks which can develop in such a construction, the failure of some of the sensing devices within the vessel presents difficult problems of maintenance. In addition, the sensing signals produced are usually analog in nature so that background noise, power supply variations, calibration uncertainties and instrument drift quite often interfere with the accuracy of the readings. Also, an analog signal is not compatible with modern digital control systems so that additional expensive equipment is required to convert the information into digital form.

Thus it has long been felt in the nuclear power reactor art and in other areas where the need has appeared that simplified and more reliable measuring devices are required, especially those which can produce the desired information directly in digital form and can avoid contamination from the contents of the nuclear reactor or other containment vessels. The best types of measuring devices would be those which are externally mounted but are capable of sensing the various conditions within the reactor vessel and can produce the information in digital form. Devices of this nature would be relatively unaffected by environmental changes and power supply variations, not subject to drift, and would be easy to maintain since the units are replaceable without opening the reactor vessel.

While the example of the nuclear reactor emphasizes the need for such types of instrumentation, it is also true that equipment of this type would be useful wherever and whenever the convenience and safety of this type of instrumentation is desirable such as in general process plants, petroleum plants, fuel tanks, etc.

Efforts have been made to adapt acoustical techniques to the satisfaction of this need, as evidenced by U.S. Patent No. 3,100,885 dated August 13, 1963, which relies on liquid-air or liquid-gas interface to reflect the sound waves introduced in the liquid from outside the vessel. However, while arrangements of this type represent substantial improvements in the art, further improvements are possible in accordance with this invention to improve the nature of the signal output so as to be digital in form. This output is then suitable for direct utilization in modern digital information computers and eliminates a possible ambiguity which could occur with reliance solely on the liquid-air or liquid-gas interface as a contact surface.

The present invention meets the requirements set forth for improved instrumentation of nuclear reactors and other devices by offering apparatus capable of sensing certain conditions within a vessel by an external arrangement which produces the information directly in digital form.

One of the conditions within a reactor pressure vessel containing liquid-air or liquid-gas interfaces to be measured is the level of liquid. In accordance with this invention an acoustical transducer is mounted externally of the vessel to inject sound pulses into the liquid medium in the vessel. These are reflected by a stepped device within the liquid to indicate the level of liquid within. This information is produced directly in digital form due to the stepped reflector and is usable directly in digital systems.

It is thus a first object of this invention to provide an arrangement for measuring the level of a liquid within a closed vessel without making any penetration thereof.

A further object of this invention is the remote sensing of liquid level within a vessel and the direct production of this information in digital form.

Another object is the measurement by remote sensing devices of physical parameters directly in digital form.

Other objects and advantages of this invention will hereinafter become obvious from the following description of preferred embodiments of this invention taken with the accompanying drawing in which.

Figure 1:
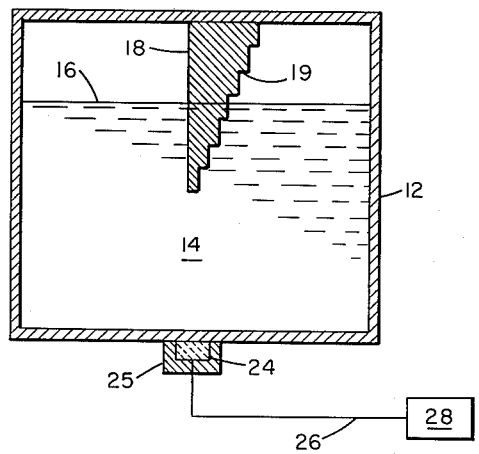
FIG. 1 is an elevation view in section of a vessel provided with a preferred embodiment of this invention for the measurement of liquid level.

Referring to FIG. 1, there is shown a closed container or vessel 12 partially filled with water 14 to a level 16. Above water level 16 may be steam or other gas. Suspended in vessel 12 and partially immersed in water 14 is a spiral stepshaft reflector 18 attached to the top of vessel 12 for support. Stepshaft 18 is provided with several annular steps 19 of uniform depth. Steps 19 are of such width that each annular step has approximately the same horizontal area. Attached to the underside of vessel 12 is a transducer 24 mounted in a holder 25 connected by an electrical lead 26 to driving and receiving circuits 28. Stepshaft reflector 18 is illustrated somewhat schematically to show the operation of the apparatus clearly. Transducer 24 is a piece of material exhibiting the well known piezoelectric effect, that is, it is capable of converting an electrical pulse to a pulse of ultrasonic energy, and vice versa. An example of such a material is lead zirconate titanate. The driving and receiving circuits 78 are conventional circuits designed to initiate and receive electrical pulses. Typical circuits are described in the report NYO-10601 (FIGS. 6.2.13 and 6.3.3) issued by the U.S. Atomic Energy Commission. Such circuits are also commercially available.

In the operation of the level indicating apparatus, transducer 24 issues a sound pulse in response to an electrical pulse which travels through water 14 until reaching stepshaft 18. Each of the separate steps 19 below the upper surface of water 14 produces a reflected sound pulse. Due to the uniform area of the steps, the reflected pulses are of substantially the same amplitude and return to transducer 24 at predetermined time intervals. In certain instances it may be desirable to have steps of non-uniform depth thereby transmitting pulses in non-uniform time intervals. The number of pulses returning will be a direct indication of where the liquid appears on stepshaft 18 as the sound waves do not pass through the surface of liquid 14 and only the immersed steps 19 produce reflected pulses.

Figure 2:
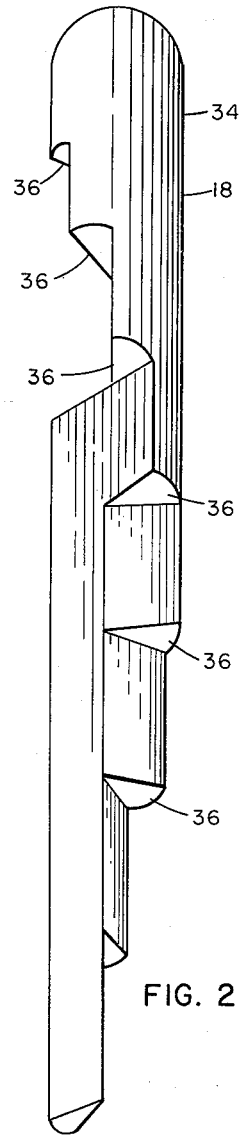
FIG. 2 is an isometric view of the step shaft reflector.

While stepshaft 18 has been shown in FIG. 1 only schematically, reference is made to FIG. 2 for details of the design. There it will be seen that stepshaft 18 may be machined from a cylindrical member 34 from which a plurality of spirally-arranged wedge shaped steps 36 are cut, so that stepshaft 18 occupies a minimum of space.

Bonding of the transducer crystal to the outer surface of the vessel in the arrangement described above can be accomplished either by the use of metal bearing electrically conductive epoxies or alloy solders. In using an epoxy, the crystal is clamped to the wall by suitable means with a layer of epoxy in between and heat supplied to cure the epoxy. Care must be exercised to remove all air bubbles, and this may be facilitated by curing the epoxy in a vacuum to help eliminate the air bubbles. A suitable solder is the lead tin eutectic with 2% silver. The alloy solder technique was successfully tested at 435° F. and was applied using the same procedure followed in the case of the epoxy.

For conditions in which the above bonding techniques might not be convenient, as under emergency replacement of a transducer, a so-called dry bonding technique has proved to be satisfactory. This technique employs optical flat mating surfaces and use of pressure to obtain the required intimacy of contact.

With regard to the acoustically reflective stepshaft, described above, the surfaces of the steps which are parallel to the transducer are arcs of circles. Experimental evidence indicates that equal areas reflect approximately equal amounts of ultrasonic energy even though each step is at a different distance from the transducer. This was noted to be true over lengths of 3 feet or less for water since attenuation in the latter is small.

Experiments were conducted on the stepshaft to determine its limiting or critical conditions. It was found that the nature of the step surface, i.e., rough or smooth, did not affect significantly the sharpness or size of the reflected pulses. However, surfaces inclined only slightly, i.e., 7°, away from the transducer reflected only a small amount of energy to the transducer to that the surfaces should be substantially parallel to or facing the transducer. Corrosion of the surfaces likewise did not affect the shaft performance.

In addition, a crystal frequency of about 4 MC. was found to be best for applications of medium range and resolution in water. Higher frequencies attenuate too rapidly while lower frequencies produce less sharply defined reflections. A crystal diameter slightly greater than stepshaft diameter provided superior results. For example, a stepshaft diameter of 1.85 inches was used with a 2 inch diameter crystal with excellent results.

Experiments with both a solid state driver and a vacuum tube ultrasonic generator showed that input power and voltage were not critical factors. Reduction of driver voltage by 50% resulted in approximately a 10% reduction in reflected signal, with no effect on signal sharpness, so that the amount of power used is not a critical factor except that sufficient power should be used to obtain the desired amplitude of reflected pulses.

It has already been noted that signal magnitude is directly related to the reflecting step area. Doubling the segment angle of a step, approximately doubles the magnitude of the signal. Regarding the mechanical alignment of the stepshaft, this is important but not critical. Alignment was found to be relatively easy for short stepshafts, i.e., 18 inches in length or less, and more difficult for long stepshafts of the order of 3 feet or more, as would be expected. Good results have been obtained using a 3 foot long, 1.85 inch diameter stepshaft with 9 equally spaced steps, pulsed by a 2 inch diameter 4 MC. crystal bonded on a 0.265" stainless steel wall.

It is thus seen that there has been provided a unique approach to the remote sensing of liquid level within a closed container and the direct production of the information in digital form. While a preferred embodiment of this invention has been described, it is understood that the scope of the invention is to be limited only by the appended claims.

We claim:
1. Apparatus for the measurement of the level of a liquid within a vessel comprising
    (a) generator means located underneath said vessel for producing a sound pulse through the wall of said vessel into said liquid in an upward direction; and
    (b) reflector means partially immersed in said liquid having stepped, flat surfaces facing said generator means to reflect a series of spaced sound pulses from the submerged surfaces, the number of reflected sound pulses thereby indicating the level of said liquid within said vessel;
    (c) said reflector means consisting of a shaft having spirally arranged, wedge shaped steps to form a compact device occupying a minimum of space within said vessel.
2. The apparatus of claim 1 in which the reflecting surfaces are substantially equal in area.

References Cited by the Examiner

UNITED STATES PATENTS

| | | | |
|---|---|---|---|
| 2,753,542 | 7/56 | Rod et al. | 73—290 X |
| 2,883,861 | 4/59 | Van Valkenburg | 73—290 |

FOREIGN PATENTS

| | | |
|---|---|---|
| 1,126,419 | 7/56 | France. |
| 15,549 of 1913 | 6/14 | Great Britain. |
| 809,681 | 4/59 | Great Britain. |
| 873,801 | 7/61 | Great Britain. |

ISAAC LISANN, *Primary Examiner.*